United States Patent [19]

Gonzalez

[11] 4,095,273
[45] June 13, 1978

[54] ELECTRONIC SLIDE RULER CALCULATOR

[75] Inventor: James Gonzalez, Monroe, N.Y.

[73] Assignee: The Raymond Lee Organization, Inc., New York, N.Y.; a part interest

[21] Appl. No.: 771,892

[22] Filed: Feb. 25, 1977

[51] Int. Cl.² ........................... G06F 7/38; G06F 3/00
[52] U.S. Cl. ................................ 364/705; 33/125 R; 364/561; 364/709
[58] Field of Search ................... 235/151.32, 152, 156; 33/75 R, 111, 125 R, 143 L

[56] References Cited

U.S. PATENT DOCUMENTS

| | | | |
|---|---|---|---|
| 3,777,126 | 12/1973 | Hoff | 235/156 X |
| 3,955,073 | 5/1976 | Carew et al. | 235/151.32 |
| 4,007,364 | 2/1977 | Ojima et al. | 235/152 |

Primary Examiner—Jerry Smith
Attorney, Agent, or Firm—Daniel Jay Tick

[57] ABSTRACT

An elongated ruler member has a plurality of spaced electrically conductive contacts thereon. A slidably mounted distance marker on the ruler member has electrically conductive contacts thereon. A calculator circuit electrically connected to the contacts on the ruler member indicates the exact position of the distance marker when such marker is manually moved in position so that the contacts of the marker make electrical contact with contacts of the ruler member directly thereunder.

4 Claims, 5 Drawing Figures

ELECTRONIC SLIDE RULER CALCULATOR

BACKGROUND OF THE INVENTION

The present invention relates to a slide ruler calculator. More particularly, the invention relates to a slide ruler calculator for indicating a measured distance to a precise fraction of a predetermined scale.

The electronic slide ruler of the invention has electrically coded contacts on its ruler member value numbers, incorporated with the electronic calculator, for measuring a distance input into the electronic slide ruler calculator memory and also displaying the measured distance in the calculator. Thus, if there are further operations, such as, for example, inputing another measured distance, addition, subtraction, etc., the resultant answer displayed in the calculator is a precise fraction.

Objects of the invention are to provide a slide ruler calculator of simple structure, which is inexpensive in manufacture, used with facility, convenience and rapidity, and functions efficiently, effectively and reliably to indicate a measured distance to a precise fraction. The slide ruler calculator of the invention thus eliminates computation with pencil and paper and avoids the need for personal remembering of details by those using a slide rule such as, for example, navigators.

BRIEF DESCRIPTION OF THE DRAWINGS

In order that the invention may be readily carried into effect, it will now be described with reference to the accompanying drawings, wherein.

DETAILED DESCRIPTION OF THE INVENTION

The slide ruler calculator of the invention indicates a measured distance to a precise fraction of a predetermined scale, be it inches, centimeters, or any desired increments.

Figure 1:
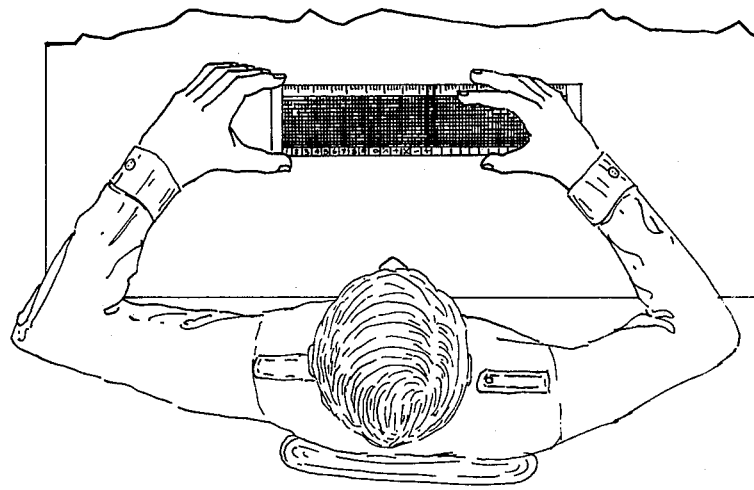
FIG. 1 is a top plan view of an embodiment of the electronic slide ruler calculator of the invention in use.
Figure 2:
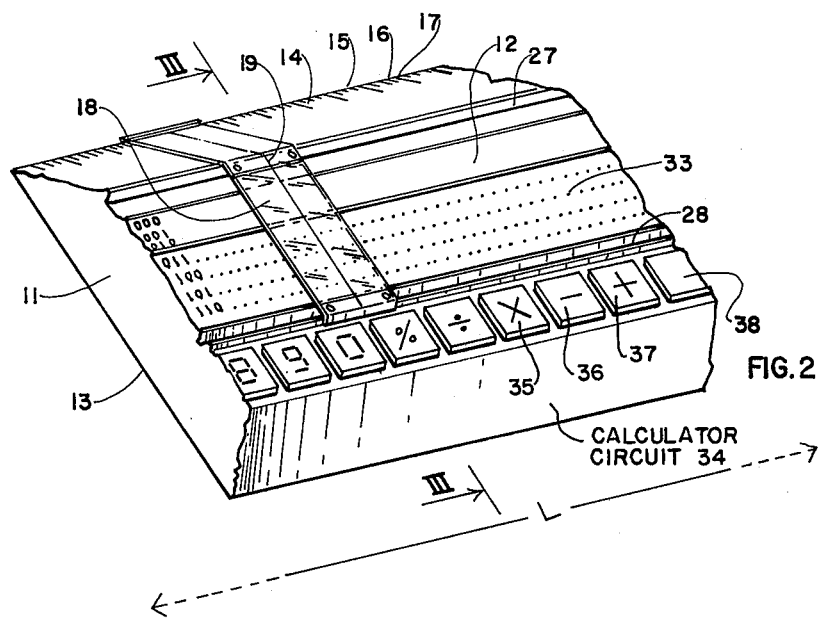
FIG. 2 is a perspective view, on an enlarged scale, of part of the embodiment of FIG. 1.
Figure 3:
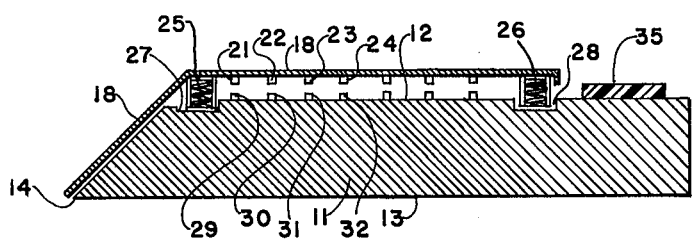
FIG. 3 is a cross-sectional view, taken along the lines III—III of FIG. 2.
Figure 5:
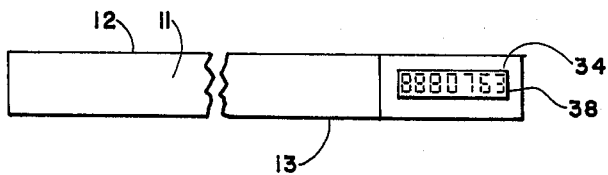
FIG. 5 is a schematic diagram of the electronic slide ruler calculator of the invention.

The slide ruler calculator of the invention comprises an elongated ruler member 11 (FIGS. 1 to 3 and 5) having spaced opposite first and second surfaces 12 and 13, respectively (FIGS. 2, 3 and 5). The ruler member 11 has a measuring straight edge 14 at the second surface 13 thereof (FIGS. 2 and 3). The measuring edge 14 has a plurality of spaced distance indications 15, 16, 17, and so on, marked thereat, as shown in FIG. 2.

A distance marker 18 (FIGS. 2 and 3) is slidably mounted for free movement along the length L (FIG. 2) of the ruler member 11 on the first surface 12 thereof. The distance marker 18 has a hair sight 19 (FIG. 2) extending transversely to the ruler member 11 across the first surface 12 and at the measuring edge 14 for visually indicating a distance on the ruler device. The distance marker 18 preferably comprises clear plastic material and the hair sight 19 comprises any suitable hair sight of the type utilized on slide rules. The distance marker 18 has electrically conductive contacts 21, 22, 23, 24, and so on, thereon, in spaced relation along the line of the hair sight 19 (FIG. 3). The electrical contacts 21 to 24, and so on, extend toward the ruler member 11, as shown in FIG. 3.

The distance marker 18 is spring-mounted, via a plurality of springs, of which springs 25 and 26 are shown in FIG. 3, on the ruler member 11 by any suitable means such as, for example, a track and groove arrangement, undercut arrangement, or guide arrangement of any suitable type, shown in FIGS. 2 and 3. Thus, for example, the distance marker 18 is supported by four springs, one at each of its four corners, with two of the springs slidably mounted in one groove or channel and the remaining two springs slidably mounted in a parallel groove or channel spaced from the first. Thus, for example, grooves or channels 27 and 28, shown in FIGS. 2 and 3, are utilized in the example shown.

A plurality of spaced electrical contacts 29, 30, 31, 32, and so on (FIG. 3), and generally indicated as contacts 33 in FIG. 2, are provided on the first surface 12 of the ruler member 11 in a predetermined pattern, indicated by the dots of FIG. 2. The pattern of the contacts 29 to 32, and so on, or 33, is such that a plurality of fractional divisions of each distance indication marked at the measuring edge 14, are provided. Thus, for example, a transverse line of spaced contacts is provided. The next-adjacent transverse line of spaced contacts is interposed between the contacts of the first line and is spaced essentially the thickness of the line from the first line. A third transverse line of spaced contacts is provided in the same pattern as the first line with the second line interposed between the first and third lines and with the third line spaced essentially the thickness of the line from the second line. Thus, each time the distance marker is moved a distance equal to the thickness of a hairline, the ruler device of the invention functions to indicate a precise measurement distance.

The contacts 21 to 24, and so on, of the distance marker 18 and the contacts 33 of the ruler member 11 directly thereunder, in the manner shown in FIG. 3, make electrical contact when the marker is manually depressed. Thus, the user moves the distance marker 18 until the hair sight is at a precise point to be measured on the scale of the ruler member. The user then depresses the distance marker 18 and the contacts of said marker and those of the ruler member directly thereunder make electrical contact.

In accordance with the invention, a calculator circuit 34 (FIGS. 4 and 5) controlled by a plurality of keys 35, 36, 37, and so on (FIG. 2), is electrically connected to the contacts 33 on the ruler member 11. The calculator circuit 34 functions to indicate the exact position of the distance marker 18 when said marker is manually moved in position so that the contacts of said marker make electrical contact with the contacts of the ruler member directly thereunder. The calculator circuit 34 includes a visible readout or display 38 (FIGS. 4 and 5) for visually indicating the exact position of the hair sight 19 of the marker 18. Thus, after the user has depressed the distance marker 18, he or she operates the appropriate keys of the calculator 34 and the calculator reads out the precise position of the hair sight to a precise fraction of a predetermined scale, such as, for example, a hundredth or thousandth of an inch or centimeter.

Figure 4:
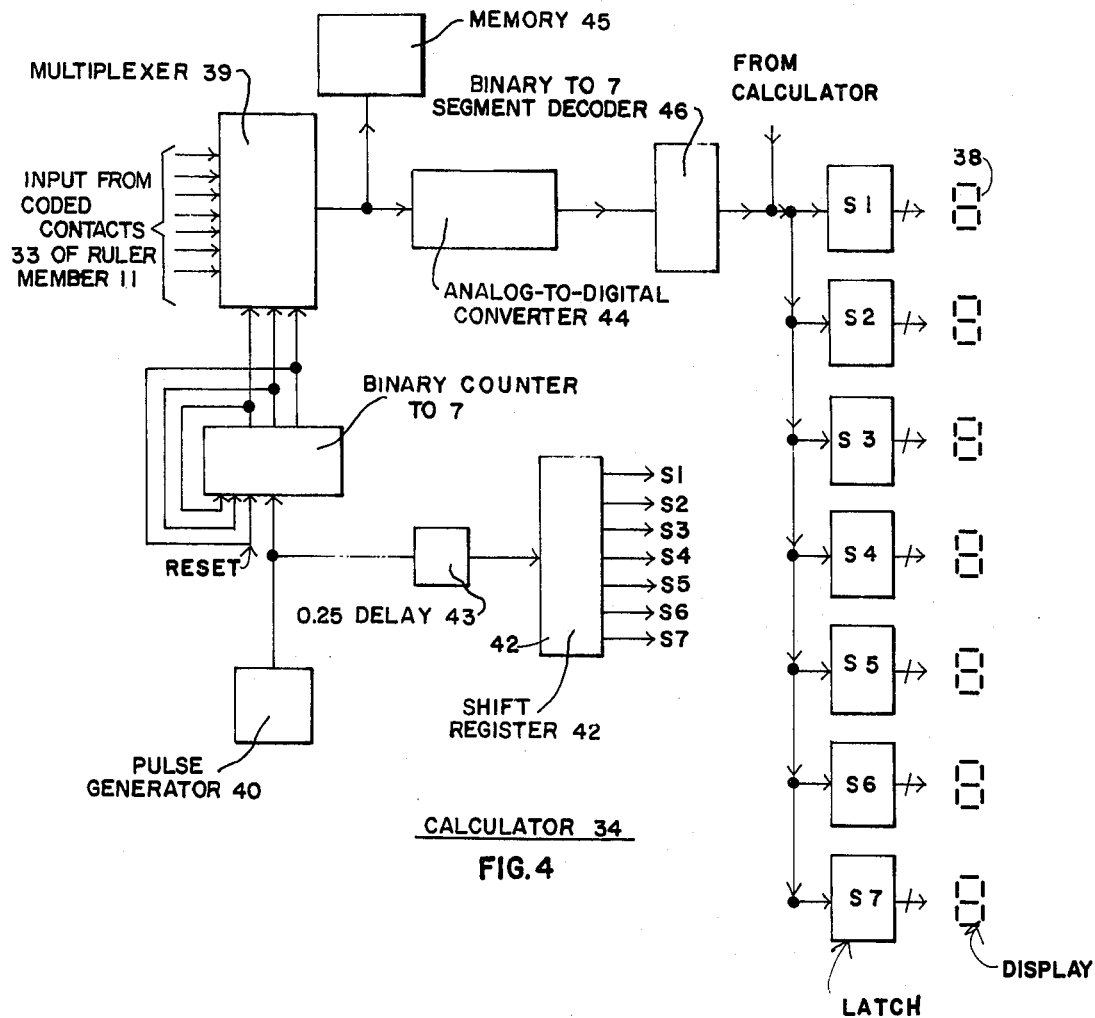
FIG. 4 is a block diagram of an embodiment of the calculator circuit of the electronic slide ruler calculator of the invention.

The calculator 34 may comprise any suitable electronic miniature calculator. As shown in FIG. 4, the calculator 34 may comprise a multiplexer 39 of any suitable known type, to which the contacts 33 of the ruler member 11 are connected, so that when a circuit is closed by the electrical contacting of the contacts of the distance marker with the contacts of the ruler member, appropriate input signals are supplied to the mutliplexer. A pulse generator 40 of any suitable known type, produces a pulse which is supplied to a binary counter 41 which counts to 7 and also supplies a pulse to a shift register 42 of any suitable known type via a 0.25 second delay 43 of any suitable known type. The shift register 42 provides a plurality of outputs S1, S2, S3, S4, S5, S6 and S7 which are supplied to latch circuits of the same designation.

The binary counter 41 produces a plurality of outputs which are supplied to the multiplexer 39 and which are fed back to its own input to reset it. The multiplexer 39 produces an output which is supplied to the input of an analog to digital converter 44 of any suitable known type. The output of the multiplexer 39 is also connected to a memory 45 of any suitable known type. The output of the converter 44 is connected to the input of a binary to 7 segment decoder 46 of any suitable known type. The output of the decoder 46 is connected in common to the inputs of the latch circuits S1 to S7. Each of the latch circuits S1 to S7 provides a corresponding readout or display 38 indicated by broken lines in FIG. 4.

Thus, as hereinbefore described, the elongated ruler member has a plurality of spaced electrically coded conductive contacts. The contacts are numbered 0 to 9 and are encoded with certain voltages, as the hand held calculator. Thus, for example, 0 is encoded at 1 MV, 1 is encoded at 2 MV, and so on. The slidably mounted distance marker on the ruler member has electrically conductive contacts to supply electrical inputs to the ruler member at the coded contact values, when the distance marker is pressed thereon. The calculator circuit electrically connected to the coded contacts on the ruler member indicates the exact position of the distance marker when said marker is manually positioned. Thus, the contacts of the distance marker make electrical contact with the coded contacts of the ruler member, directly thereunder.

As an example, it is assumed that the distance marker is positioned at a value of 10.1250, equal to 10⅛ inches. In order to pick up this value, the distance marker is pressed down. Contact is then made with the ruler member. All seven input signals of 10.1250 of the ruler member are supplied as input through the multiplexer.

The seven place values of the reading from the ruler member are encoded. Thus, for example, Tens — 000
Unit — 001
Decimal — 010
Tenth — 011
Hundredth — 100
Thousandth — 101
Ten thousandth — 110
Reset — 111

The first signal picked up is therefore the tens digit. In this case, it is 1. The binary counter is augmented by means of the pulse generator and modulated by the delay at 0.25 second. The 1, is then fed to the memory of the calculator and is also displayed by the seven segment LED on S7 after passing through the analog to digital converter and the seven segment decoder.

After 0.25 second, a second signal is picked up. Such signal is, in the present example, a unit, or 0. This signal is fed through the same route as the first signal 1. At the same time, the first input signal 1. is shifted from S7 to S6. The decimal point is also picked up after 0.25 second. After 2 seconds, all seven inputs, or 10.1250, are displayed. Thus, if further operations, such as addition, subtraction or inputing of another value, etc. are required, such operations can be carried out normally as if data has been supplied as input through the keyboard of the calculator. When the binary counter has counted to 7, or 111, it resets the counter to 000 again.

The electronic slide ruler calculator of the invention inputs data of a measured distance to the calculator and calculates the measured distance in said slide ruler calculator in accordance with the problem to be resolved, be it a percentage, division, etc. The slide ruler calculator functions in inches, centimeters, or any desired increments.

A slide ruler converter may be set up in the calculator. As hereinbefore described, the electronic slide ruler calculator of the invention comprises the elongated ruler of any increments. Place value encoded contacts are provided in the ruler member, as a hand held calculator coded keyboard. The coded contacts are connected to the multiplexer. The distance marker is slide mounted on the ruler member and has a hair sight indicator for the measured distance. The distance marker has electrical contacts to input electrical contacts to the encoded contacts of its ruler member. The electronic calculator circuitry receives the data input from the encoded contacts of the ruler member, and includes a memory and a visual display. The keyboard has numbers and a math section for the input data.

The contacts 21 to 24, ans so on, on the distance marker of the ruler member are coded contacts. That is, each of these contacts represents a number. Thus, for example, 0 on the distance marker is coded by 1 MV, 1 is coded by 2 MV, 2 is coded by 3 MV, and so on. Each single contact is thereby encoded by a corresponding number of millivolts, in accordance with the number represented by the contact, in the same manner as the numbers of the calculator keyboard. The multiplexer picks up the coded contact from the ruler member contacts and transmits the signal to the memory and display.

While the invention has been described by means of a specific example and in a specific embodiment, I do not wish to be limited thereto, for obvious modifications will occur to those skilled in the art without departing from the spirit and scope of the invention.

I claim:

1. An electronic slide ruler calculator for indicating a measured distance to a precise fraction of a predetermined scale, said ruler calculator comprising
   an elongated ruler member having spaced opposite parallel first and second surfaces and a measuring straight edge at the second surface, said measuring edge having a plurality of spaced distance indications marked thereat;
   a distance marker slidably mounted for free movement along the length of the ruler member on the first surface thereof and having a hair sight extending transversely to the ruler member across the first surface and at the measuring edge for visually indicating a distance on the ruler device, said distance marker having electrically conductive contacts thereon along the hair sight;
   a plurality of spaced electrical contacts on the first surface of the ruler member in a predetermined pattern whereby a plurality of fractional divisions of each distance indication marked at the measuring edge are provided, the distance marker being spring mounted on the ruler member in a manner whereby the contacts of the marker and those of the ruler member directly thereunder make electrical contact when said marker is manually depressed; and calculator circuit means electrically connected to the contacts on the ruler member for indicating the exact position of the distance marker when said marker is manually moved into position and manually depressed so that the contacts of said marker make electrical contact with contacts of said ruler member directly thereunder.

2. An electronic slide ruler calculator as claimed in claim 1, wherein the calculator circuit means includes visible readout means for visually indicating the exact position of the hair sight of the marker.

3. An electronic slide ruler calculator, as claimed in claim 2, wherein the calculator circuit means includes memory means for maintaining a measured distance and simultaneously displaying the measured distance in the visual readout means, said calculator circuit means carrying out additional operations including addition, subtraction and the input of another measured distance.

4. An electronic slide ruler calculator, as claimed in claim 1, wherein the electrical contacts of the ruler member are encoded to transmit electrically encoded inputs to the calculator circuit means when the contacts of the distance marker are placed in electrical contact with the contacts of the ruler member.

* * * * *